United States Patent
Charkey et al.

[15] 3,652,338
[45] Mar. 28, 1972

[54] ELECTROCHEMICAL SYSTEM COMPRISING LAYERED SILICATE FILM SEPARATOR

[72] Inventors: Allen Charkey, Flushing; Derryk Brooks-Smith, Brooklyn, both of N.Y.

[73] Assignee: Yardney International Corporation, New York, N.Y.

[22] Filed: Aug. 22, 1969

[21] Appl. No.: 852,497

[52] U.S. Cl. ..................................................136/146
[51] Int. Cl. ..................................................H01m 3/00
[58] Field of Search..............136/146, 148, 6, 142–143, 136/153, 86; 204/295, 301, 180; 252/449, 454, 455, 477, 63.5; 210/509–510; 106/39, 65, 68–69

[56] References Cited

UNITED STATES PATENTS

| | | | |
|---|---|---|---|
| 3,346,422 | 10/1967 | Berger | 136/148 |
| 3,364,077 | 1/1968 | Arrance et al. | 136/146 |
| 3,379,570 | 4/1968 | Berger et al. | 136/6 |
| 3,437,580 | 4/1969 | Arrance et al. | 204/295 |
| 3,446,669 | 5/1969 | Arrance et al. | 136/6 |
| 3,471,330 | 10/1969 | Berger et al. | 136/6 |
| 3,489,610 | 1/1970 | Berger et al. | 136/6 |
| 3,490,953 | 1/1970 | Berger et al. | 136/153 |
| 3,497,394 | 2/1970 | Berger | 136/153 |
| 3,497,389 | 2/1970 | Berger et al. | 136/86 |

*Primary Examiner*—Anthony Skapars
*Attorney*—Karl F. Ross and Herbert Dubno

[57] ABSTRACT

Films, membranes and pellicle coatings of layered silicates are provided for selective ion separation. These films, as coatings upon a substrates or as flexible self-supporting foils, provide ion separation by selectively restricting ion mobility, particularly, but also, to some extent, molecular mobility as well. The specific use of layered silicates provides selective separations that are more complete than those available with similar silicates generally, not possessing the layered structures. These films are advantageously used in the strenuous environment of rechargeable electrochemical cells where they function as excellent interelectrode separators. The use of polymers as binders for the films is disclosed but the disclosure is not limited to the use of binders and the layered silicates may be formed into binderless pellicles upon substrates.

5 Claims, No Drawings

3,652,338

ELECTROCHEMICAL SYSTEM COMPRISING LAYERED SILICATE FILM SEPARATOR

FIELD OF INVENTION

This invention relates to microporous foils, membranes and barrier layers and more particularly to dimensionally stable barrier layers and membranes thereof that provide selective ion separation and are resistant to chemical and electrochemical attack in such strenuous environments as battery electrolytes.

BACKGROUND OF THE INVENTION

Permselective membranes and particularly semipermeable membranes have been proposed for many uses including dialysis, diffusion, reverse osmosis, ion exchange, ion-mobility control, and crystallization inhibition. The last two types of uses are of particular importance in the electrochemical field to localize the concentration of certain soluble ions and to prevent the electro deposition of crystallized metals in the interelectrode space during battery-charging operations. Electrochemical battery cells require separators of such materials.

Generally membranes suitable for battery service are more than adequate for other semipermeable applications. This suitability can be appreciated when the extreme corrosivity of the usual battery electrolytes is considered. They usually are either concentrated acids or alkali solutions or fused salts. In addition within the battery extremely severe conditions are imposed by the oxadative nature of the electrode reactions and reactants.

OBJECTS OF THE INVENTION

It is therefore an important object of the present invention to provide membranes with a high degree of permselectivity and a low degree of ohmic resistivity, and which are substantially resistant to the medium in which they are utilized.

It is another object of this invention to provide permselective membranes suitable for use as interelectrode separators in and for electrochemical cells including those of storage batteries.

It is a further object to provide improved separator materials for electrochemical systems which are capable of preventing cell shorting by the deposition of metallic particles during electrochemical reduction in the recharging of battery cells.

It is still a further object of this invention to provide battery separators of such permselective membrane materials suitable for use in cells operating at high oxidative potentials and which are resistant to oxidation at such potentials as well as being resistant to the aforesaid deposition of metals within the body of the separator.

It is another object of this invention to teach a method for the manufacture of such permselective membranes and separators. It is a further object of this invention to provide pellicles and membranes for dialysis, electrophoresis, osmosis, chromatography, molecular solution diffusion and microporous filtration.

SUMMARY OF THE INVENTION

We have found that the above objects are surprisingly achieved by utilizing a class of materials consisting essentially of layered, hydrated silicates. These materials may be bound in a matrix or suitable binder, or may be in the form of a leaf or layer bonded by its own clay-like consistency. More specifically, the layered materials are chosen from the group of hydrated, crystalline materials having layered structures such as silicates and aluminosilicates. By a layered structure in the above context we mean particularly those materials where the $a$ and $b$ axes of the crystal lie in a single plane; these planes or layers being connected to layers through the bonding of hydroxyl or water groups along the $c$ axis of the crystal. These layered silicates and aluminosilicates are further characterized by their ability to exchange ions, water and molecules into and out of the crystal lattice in a reversible manner.

In general, the layered silicates and alumino silicates are formed from sheets or layers consisting of four-, six-, and eight-membered ring tetrahedra each of which shares three corners with adjacent tetrahedra giving the approximate composition of $Si_2O_5$ or $(Si\ Al)_2O_5$.

Based on the structure of the layers, three main classes of layered silicates may be distinguished:

1. the single layer having a composition of $Si_2O_5$ or $(Si\ Al)_2O_5$;
2. the so-called double layer silicates having a composition of $(Si\ Al)O_2$ which occur only in the aluminosilicates;
3. composite layer structures of one or two Si-O sheets combined with layers of hydroxyl groups firmly held to the Si-O sheets by Mg, Al or some other suitable atom, as in kaolins and santonite.

All three of the above classes of the layered materials are deemed within the scope of this invention but since examples of the class 1 are quite rare and therefore are less amenable to inclusion in commercially meaningful structures, the materials of class two and three are preferred.

It should be noted that aluminosilicates and silicates have been taught in the preparation of microporous sheets by ARRANCE and BERGER in U.S. Pat. No. 3,446,669 among others. However, these teachings refer to materials in the final form of oxides from which the water or hydroxyl groups have been removed by calcination, or similar dehydrating operations. After such calcination, the characteristic layered structure for this invention, is disarranged. Such disarranged materials do not possess the unusual characteristics which make the unique products of this invention particularly serviceable.

We have found that, in order to achieve truly permselective membranes for use in liquid environments as opposed to microporous structures of the prior art, the crystalline material must be hydrated, i.e., fully saturated with chemically bound water or hydroxyl groups, and possess the layer-type structure. Dehydration of the alumino-silicates and silicates causes a crystalline conversion to mullite structures. We have found that such structures destroy the selective permeability or mobility which is an important feature of this invention. Calcining or any other treatment which removes the water of crystallization destroys the desired layered structure of the materials and must be avoided. Further it alters the rate of ion transfer through the membranes and changes the resistivity of the membranes films and pellicles of this invention.

We have prepared membranes from the general classes of materials described above. Especially important for this purpose have proven to be the so-called clay minerals including beidellite, montmorillonite and kaolin groups, and the zeolites of which clinoptiolite and faujasite are a prime examples. In addition, to the naturally occurring zeolites, a variety of synthetic zeolites based on the general formula $Na_2O\ (Al_2O_3)SiO_2\cdot H_2O$ have served adequately as the materials for the membranes of this invention.

The term layered silicate as used herein is intended to include the classes of layered silicates and aluminosilicates with or without the presence of additional elements in the molecule but at least having the characteristic layered structures defined above.

Many of the above materials, while possessing the proper crystalline structure, may form colloids or may even dissolve in certain of the intended environments, such as the strongly alkaline battery electrolyte solutions. Under such intended uses, we have found that it is best to replace the hydrolyzable ion with an insoluble ion having a substantially similar ionic radius to prevent collapse or distortion of the layered crystalline lattice of the layered silicate.

In the broad group of layered clays which are generally suitable for this invention, the Montmorillonite-Beidellite (bentonite) clays serve as an example of layered silicates which tend to dissolve in certain environments. The bentonite clays tend to solubilize in electrolytes of KOH solutions having concentrations of over 25 percent KOH. Such bentonite clays have the general formula $(Mg.\ Na)\ O.Al_2O_3.\ 4\ SiO_2\ Na\ H_2O$.

In such bentonites the sodium radius is 0.95 A. Ions of similar radius which will resist hydrolysis of the clay are listed in the Table.

TABLE 1

| Ions | Radius (A) |
| --- | --- |
| Cadmium | 0.970 |
| Samarium | 0.964 |
| Yttrium | 0.930 |
| Neodymium | 0.995 |
| Cerium | 1.03 |
| Lanthanum | 1.06 |
| Calcium | 0.99 |
| Europium | 0.95 |
| Gadolinium | 0.938 |

The first six ions in Table 1 are preferred replacements for the sodium ion in bentonite; whereas the latter four ions when incorporated into the bentonite crystal structure, have been noted to be slightly solubilized in 31 percent KOH solutions after about 1 month.

The procedure for the exchange of the sodium ion in the bentonite by cadmium or the other insolubilizing ions in order to modify the bentonite for use of such layered-silicates in an extreme alkaline environment is set forth in Example 1 below.

The resultant product is referred to hereafter as cadmium bentonite when cadmium is the insolubilizing ion. The preparations of coated battery separators from this cadmium bentonite is set forth in example 2 for coated separators where the separator material is directly coated upon either or both electrodes and in Example 3 for separators of self-supporting membranes for interposition between the electrodes. The cadmium bentonite in Example 3 is provided with mechanical integrity by the use of polymeric binding materials. Example 4 demonstrates the use of the layered silicates of this invention in thin-layer chromatography.

Where the layered silicate is resistant to its environment, as for instance in acid or salt-solution electrolytes, it is not necessary to modify the naturally occurring layered-silicates. Depending on the source of the clay however, it may be advisable to free certain of the clays of impurities which otherwise might be liberated during use and prove deleterious either to the electrodes or the electrolyte. Partial delamination of the layered silicates may be resorted to in the case of naturally occuring clays in order to liberate any interstitial impurities such as iron. After delamination these impurities are easily washed away. As long as the essentially-layered crystal dimensions are maintained, any suitable purification process can be used. It must be pointed out however that temperatures reached in these purification treatments must, at no time, exceed the dehydration or rearrangement temperatures of the clay. The rearrangement temperature is the specific temperature at which the layered-silicates begin to lose their water of hydration, lose their layered structures and are converted to mullites or other compounds having more orthodox prismatic crystalline structures.

This invention is generally described by the preferred examples set forth below, but these merely set forth the manner in which the invention meets the most stringent conditions required of separators for rechargeable alkaline batteries. For less rigorous conditions existing under the other intended uses for the layered-silicate films, barrier or membranes of this invention, any of the other layered-silicates in membrane form may be used as long as these silicates maintain their characteristic layered structure and are insoluble in their environment.

The layered-silicate interelectrode separator of this invention may be applied directly to one or both of the electrodes of the electrochemical cell. The material may be applied to form membranes consisting of self adherent layers, either by dipping the electrodes into a slurry of the silicates or the silicates may be applied by either painting or spraying the slurries unto the electrodes. The coatings may be applied either as a single layer or as successive layers of the silicates and may be applied with or without intervening drying between the layers and after the final coat. It is preferred to dry the layers between coatings at about 100° C. by circulating air of controlled humidity over the faces of the coated electrodes. Too rapid removal of the water is to be avoided to prevent spalling of the coating from the electrode. The coating slurries may be pure slurries of the layered-silicates in suitable media such as water or binding materials may be added. Binders include any of the macro-molecules of inorganic or organic polymers which will not interfere with the intended purpose and which will promote adhesion of the layered-silicates and alumino silicates to the face of the electrodes.

Although these separators may be supported on one or both of the electrodes, it is preferred to prepare the separators in the form of self-supporting membranes of the layered-silicates incorporated into a synthetic resinous body or matrix. Any resin matrix that is insoluble and resistant to the intended environment and which will permit the matrix particles to be bonded to each other and have the imbedded inclusions of layered silicates adjacent to each other and extending through the separator membrane from each of its faces is satisfactory. An important consideration for the matrix material is that it must not have a continuous phase completely engulfing the inclusions of layered-silicates. Suitable matrix materials for use in alkaline electrolytes include the fluocarbon resins such as polytetrafluoroethylene (Teflon), polypropylene, polyethylene, and polyvinylalcohol, all of which are usitable for alkaline solutions. Of these Teflon is preferred. Any other macromelecular organic resinous material which is resistant to and insoluble in other electrolyte environments may be used for separators or other purposes.

It is preferred to have the synthetic resins in a more or less resilient or elastic state in order to resist shock and vibration as well as the dimensional stresses arising out of the changed physical dimensions of these electrodes resulting from the electrochemical reactions and for the heat generated by these reactions.

EXAMPLE 1

Cadmium Bentonite

Montmorillonite clay (sodium bentonite) in plus 400 mesh powder is added to a saturated cadmium acetate solution in the proportion of 50 grams of the clay powder to 100 cc. of solution. The slurry is stirred for 24 hours to ensure the complete exchange of cadmium for the sodium ions. The cadmium bentonite is filtered and washed with water to free the precipitate of excess cadmium acetate and is then air dryed at about 100° C. The drying temperature is maintained below the decomposition temperature for the cadmium-substituted mineral. The dried material is then crushed and seived through a 400 mesh screen.

EXAMPLE 2

Separator Coating

A slurry is prepared from the cadmium bentonite made by the process of Example 1. The slurry, containing about 80 percent solids has the consistency of thick, freshly-agitated paint. A zinc/zinc oxide electrode of the type commercially used in silver-zinc batteries is dipped into the stirred slurry and the adherent coating is slowly dried in a current of air at 60° C. When the "shine" of excess moisture disappears, the coated electrode is redipped into the slurry and another coat is deposited thereon. The recoated electrode is again dried as above and then completely dried in a forced draft oven at about 100° C. until "bone" dry (i.e., less than 5 percent moisture loss after three successive 10 minute drying intervals). The cadmium bentonite layers on the zinc electrodes are about 15 to 25 mils thick. After wrapping the coated electrodes in Pellon (felted nylon) and cellophane, the wrapped zinc/zinc oxide electrodes with separators according to this invention coated thereon are assembled into conventional zinc/nickel cells. The cells are filled with 35 percent aqueous KOH electrolyte containing zinc oxide — 80 grams per liter. The cells are then subjected to a charge/discharge regime with a discharge rate of 200 milliamps/inch$^2$ and a charging rate of 80 milliamperes per inch$^2$. A set of controls consisting of cells having identical construction but uncoated zinc electrodes is cycled at the same regime. It was noted that the control cells had lost 50 percent of capacity by 18–25 cycles whereas within this cycling range all the test cells still maintained at least 90 percent of their original capacity. Major capacity losses were only first noted on some test cells on this stringent regime after 35 cycles. Microscopic examination after dissection of the test cells indicated localized spalling of the coating and zinc penetration in these areas of physical failure.

EXAMPLE 3

Teflonized Cadmium Bentonite Separator

To 50 grams of cadmium bentonite (plus 400 mesh) is added No. 30 Teflon emulsion to the amount of 20 percent by weight of Teflon solids to the cadmium bentonite. The resultant powder/emulsion mixture is blended for about 5 minutes in a Waring blender and dried at 100° C. for 4 hours. The resultant rubbery cake is then dry ground in a blender and fabricated into a rigid separator structure by uniformly spreading the ground powder in a mold cavity and pressing it at 15 tons per square inch. The separator obtained has the following properties:

weight — 0.2 grams/inch$^2$
thickness — 0.028 inch
resistivity — 0.081 ohm/inch$^2$ (in 35 percent KOH)

The separator film exhibits semipermeable properties in that it shows a positive pressure to KOH when tested in an Osmometer.

This self supporting flexible separator film structure was evaluated in secondary zinz/air cells which were assembled in the usual manner with state of the art air cathodes. The cells (theoretical capacity 6.7 AH based on zinc and nominal 5 AH capacity) were cycled at the C/5 rate to 100 percent discharge and charged at the C/16 rate. The capacity of the cells at cycle 5 was 5.0 AH and had dropped to 4.25 AH after 67 deep cycles. At 100 cycles the capacity of the cells still exceeded 3.0 ampere hours. Control cells fabricated with cellophane separators completely shorted after only 22 cycles on this regime.

EXAMPLE 4

A thick slurry of the cadmium bentonite, prepared according to Example 1, is coated upon a substrate consisting of a glass sheet, cleaned and prepared for thin-layer chromotography (TLC). The coating is air-dried at temperatures below the dehydration temperature of the bentonite. The resultant TLC pellicle provided excellent separation of components of dye mixtures and plant extracts by the usual TLC techniques.

Thus it can be seen that the films pellicles and membranes of this invention either upon a substrate or within a supporting matrix providing selective separation of ionic and nonionic species through its faces or along its body. This separation seems to result from some inherent feature within the bonding of the layers of the layered silicates as similar films, prepared with dehydrated silicates and aluminosilicates, showing mullite-like structures, do not exhibit the same order of selective separation. Particularly in batteries, it was noted that films made from mullite-like materials did not exhibit any semipermeable qualities and did not prevent or repress zinc penetration to the degree exhibited by the films and membranes of this invention. The difference between dehydrated materials and the materials according to this invention was of at least an order of magnitude (factor of 10) which indicates the advantage of the layered structure. Similarly in TLC tests, films of materials exhibiting the layered silicate structure provide better separation of ionic components when compared with silicate materials of non-layered structures.

We claim:

1. In an electrochemical system having a pair of electrodes and an electrolyte in contact therewith, the improvement which comprises an interelectrode permselective separator between said electrodes and composed at least in part of a plurality of layers of a pellicle-forming layered silicate of at least one metal selected from the group which consists of sodium, aluminum, cadmium, samarium, yttrium, neodymium, cerium, lanthanum, calcium, europium and gadolinium, said pellicle-forming silicate being insoluble in said electrolyte, undehydrated and saturated with chemically bound $H_2O$ and $OH$.

2. The improvement defined in claim 1 wherein said separator consists of said layered silicate and a synthetic resin binder therefor.

3. The improvement defined in claim 2 wherein said binder is a tetrafluoroethylene polymer and said silicate is sodium silicate in which the sodium has been displaced by cadmium.

4. The improvement defined in claim 1 wherein said separator is deposited upon one of said electrodes.

5. The improvement defined in claim 1 wherein said separator is self-supporting.

* * * * *